United States Patent
Meriggi

[15] 3,682,090
[45] Aug. 8, 1972

[54] COFFEE BAR MACHINE
[72] Inventor: Vincenzo Meriggi, Milan, Italy
[73] Assignee: Coffee Corporation S.A., Luxembourg, Italy
[22] Filed: Feb. 19, 1971
[21] Appl. No.: 117,029

[52] U.S. Cl. ................................................99/289
[51] Int. Cl. ....................................A47j 31/00
[58] Field of Search.........99/289, 300, 304, 305, 282

[56] References Cited

UNITED STATES PATENTS

| | | | |
|---|---|---|---|
| 2,122,216 | 6/1938 | Seawell | 99/289 |
| 2,601,943 | 7/1952 | Torrese | 99/289 |
| 3,046,869 | 7/1962 | Reynolds | 99/289 |
| 3,446,137 | 5/1969 | Pryor | 99/289 |

*Primary Examiner*—Robert W. Jenkins
*Attorney*—Silverman & Cass

[57] ABSTRACT

A coffee bar machine for producing and dispensing white coffee beverage from lyophilized industrial white coffee by introducing a metered quantity of said lyophilized coffee and a metered volume of heated water to a pivotally mounted mixing vessel from separate storage vessels for said coffee and unheated water, a pair of metering devices associated respectively with said separate storage vessels, the coffee metering device comprising an obturator or rotary disc device mounted on a motor driven shaft, the water metering device comprising a poppet valve operable by a cam mounted on the said motor driven shaft; a second cam is also mounted on said motor shaft and is operable to orient the mixing vessel in one orientation for receiving the ingredients and a second orientation inclined for dispensing the mixed beverage. The unheated water is measured into a conduit and heated in transit therethrough, the conduit including a coil disposed in an electrically operated heating device, the conduit terminating adjacent the mixing vessel. A manually operable lever is described for overriding the valve, if desired. A passageway arrangement is described whereby the flow of unheated water to the conduit is substantially constant. An air bleed or back pressure relief is described as applied to the water storage vessel and, also, a suction arrangement is described for reducing dust and/or water vapor found in the vicinity of the mixing vessel.

34 Claims, 1 Drawing Figure

PATENTED AUG 8 1972
3,682,090
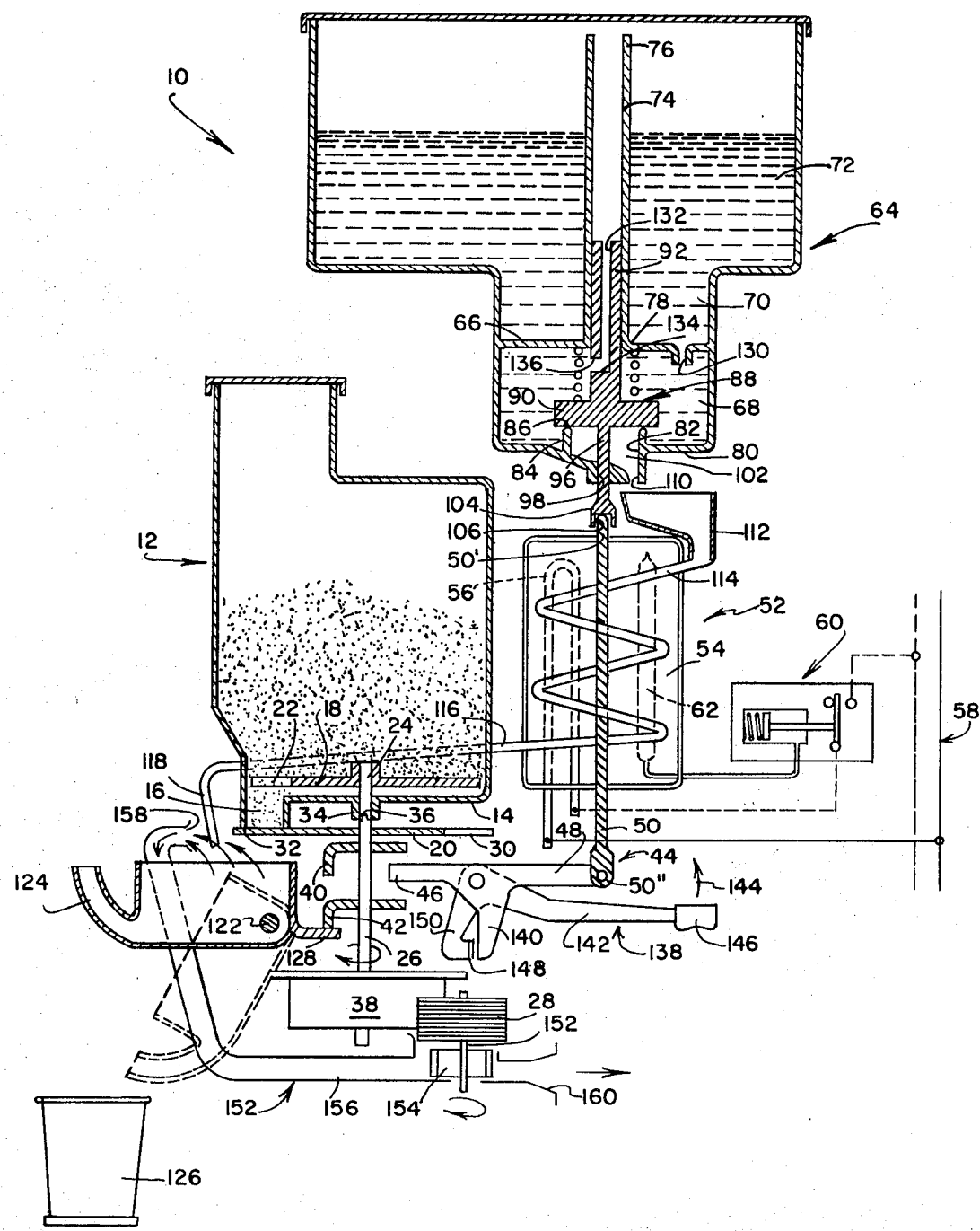
Inventor
VINCENZO MERIGGI
BY
Silverman & Cass
ATTYS.

3,682,090

COFFEE BAR MACHINE

FIELD OF THE INVENTION

The invention relates generally to coffee dispensing apparatus and more particularly provides an improved coffee bar machine for producing and dispensing cups of white coffee drink from lyophilzed industrial white coffee product and being capable of use in coffee bars and at residences.

A beverage known as "white coffee drink" is well known through Italy. This beverage or drink conventionally is provided in public establishments known as "coffee bars" and as it is produced thereat involves the use of a special type of coffee drink which is cooled, crushed ice added thereto and topped off with whipped cream. The drink is made from a grind of a preselected mixture of varieties of roasted so-called "colonial" coffees. Conventional machines used produce such white coffee drink in coffee bars involve a process of infusion of the ground coffee with hot water at a temperature of less than 100° centigrade but under a pressure of 6 to 8 atmospheres.

The taste characteristics of the drink thus produced are distinct and have achieved the considerable interest. However, this beverage generally is available only at the coffee bar establishments. It is desirable therefore, to provide apparatus whereby such white coffee drink can be provided both in the home, and at coffee bars, simply and economically but with no loss in the intrinsic characteristics of the well known beverage. Attempts have been made to provide miniature coffee bars for this purpose, but without appreciable success.

It also is suitable to produce a dehydrated white coffee product utilizing the technique of lyophilizing and storing same in the form of a fine powder until use, at which time, the powder is dissolved in hot water, like the so-called "instant" beverages. Thus, we have an "instant" white coffee drink. The use of the lyophilized coffee powder is suitable for home consumption, but, on the other hand, is not particularly suitable for use in coffee bars and similar places of public consumption. At a coffee bar, the purchaser seeks relaxation in a casual atmosphere rather than the speed of a vending machine. The relaxation thus afforded is generously rounded off by a drink of a favorite aromatic beverage which is sufficiently consistent in its quality to satisfy the expectation of such clientele, taking into account as well the requirements of the personality of the individual, that is, individualized taste.

On the other hand, methods of preparation of white coffee beverage heretofore involving a preselected mixture of roasted coffees, require a multiplicity of operations in the public bar context. These operations are expensive in both money and time, and further are negative with respect to maintaining consistency of the resulting beverage.

Applicant has concluded that a greater degree of consistency in the quality of the drink be desirable as well as a higher degree of economy in its preparation, and hence, believes it would be advantageous to provide hot white coffee beverage in the bar context from the lyophilized industrial white coffee product but without depriving the bar atmosphere of those aspects and features which, at the present time, are essential to it and absent in use of vending machines using lyophilized coffee product.

Accordingly, it is the principal object of this invention to provide a novel and compact white coffee beverage producing and dispensing machine for use in bars or residences, which machine utilizes lyophilized white coffee powder to prepare the beverage in cups for the making of said white coffee drink while maintaining consistency between the plurality of consecutively dispensed drinks.

SUMMARY OF THE INVENTION

A white coffee dispensing bar machine or apparatus which includes a pair of reservoirs, one for lyophilized white product and the other for water, means for dispensing predetermined quantities of said white coffee product and water to a receptacle for mixing, means for conducting and means for heating said water, during its travel from said reservoir to said receptacle, and means for coordinating delivery of said metered quantities to the mixing receptacle and from the mixing receptacle to a cup.

BRIEF DESCRIPTION OF THE DRAWING

The FIGURE is a schematic representation of the coffee bar machine or apparatus according to the invention.

DESCRIPTION OF PREFERRED EMBODIMENTS

Referring to FIG. 1, the reference numeral 10 generally indicates the "white coffee bar" machine according to the invention, and reference numeral 12 indicates generally the substantially cylindrical, airtight sealed vessel or reservoir for containing and holding a supply of lyophilized white coffee product. The base 14 of said vessel 12 has a chamber 16 for holding a predetermined quantity of said powder. Together with the chamber 16, an upper rotatable obturator disc 18 and a lower rotatable obturator disc 20 is provided to close off said chamber 16, and together function as a metering device for said lyophilized powder. The disc 18, which is disposed at the base 14 of the vessel 12, has an opening 22 formed therein and arranged selectively to be placed over the mouth of chamber 16 and functions as the input to chamber 16. Discs 18, 20 are arranged coaxial mounted on an extension shaft 24 releasably coupled to shaft 26 of motor 28. Disc 20 also has an opening 30 diametrically offset from the opening 22 in disc 18 so that when the opening 22 communicates with the chamber 26, the lower end of the chamber 16 is sealed by disc 20. The respective orientation of discs 18 and 20 places opening 30 of disc 20 in communication with the outlet mouth 32 of chamber 16 while the body of disc 18 seals off the chamber 16 from the remaining portion of vessel 12. The vessel 12 has a central, hollow depending tubular portion 34 in which shaft 24 is journaled. Shaft 24 is coupled to shaft 26 by a pin and slot connection 36. The disc 30 is mounted outside the vessel 12 on shaft 26. With this arrangement, it is possible to detach and exchange the reservoir 12 for cleaning, repair, readdition of product or replacement.

Shaft 26 is coaxial and integral with the output shaft (not shown) of the reduction gear 38, the input of which is driven by an electric motor 28. Two cams 40 and 42 are mounted coaxially and spaced apart on shaft 26 between the disc 20 and the reduction gear 38. Cam 40 controls a lever 44 by acting upon one arm 46 thereof while the other arm 48 is articulated to the end of an actuator rod 50 slidably engaged axially and centrally in electrically operated heating means 52 including a metal mass 54 incorporating an electric resistor connected to a power source 58 through a contact breaker 60 operated by a thermostat 62, the latter also being incorporated in the metal mass 54. Above the electrical heater means 54 and coaxially disposed therewith, at least in its lower portion in relation to the slidable actuator rod 50, there is a vessel 64 designed to hold unheated water and serving as a reservoir therefor.

The vessel 64 is divided by a partition or diagram so as to define two chambers 68 and 70. The chamber 68 is below the chamber 70. The chamber 70 extends upwards and is enlarged in diameter to define the upper portion 72 thereof. The partition or diaphram 66 carries a centrally located hollow tubular portion 74 extending upwardly normal relative to diaphram 66. The length of tube 74 is selected so that its open upper end 76 projects above the level of the water contained in the vessel 64. The tubular portion 74 opens into chamber 68 at its lower end 78. The base 80 of bottom chamber 68 contains a central recess 82, the upstanding cylindrical rim 84 of which extends above the base 80 of the chamber 52 to form a seat 86 circular in configuration for a poppet valve, shown generally by reference character 88. The disc 90 of said poppet valve 88 is arranged for vertical reciprocation to and from the seat 86. A stem 92 extends integral with and upwardly from disc 90 in slidable engagement within the tubular portion 74 of partition 66. Coil spring 94 is utilized to bias disc 90 tight against the seat 96. Spring 94 is arranged about lower end 78 of tube 74, and encircles the stem 92. One end 94' of the spring 94 bears against the partition 66 and the other end 94" bears against upper surface of disc 90. A rod 96 depends from and is integral with disc 66 and is coaxial with said stem 92. Said rod 96 is sealably, slidably engaged through the passage 98 formed in the floor 100 of chamber 102 and terminates in an enlarged portion 104 having a socket 106 into which is received the upper end 50' of rod 50, rod 50 extending, out of and through the heater means 52. Thus, the storage tank with its valved chamber 68, etc. can be removed, replaced, or another vessel substituted therefor without appreciable interior disassembly.

The outlet chamber 102, has an obliquely concical configuration, with the floor 100 having outlet passage 110 formed therein at the apex of said obliquely conical floor 100. Outlet port or passageway 110 opens to wide mouth hopper 112 of helically arranged conduit or coil 114 which passes through the metal mass 54 of heater means 52 and continues by way of elongate extension 116 to terminate in a spout 118 positioned immediately adjacent the mixing tank 120.

Mixing vessel or tank 120 is mounted so that it pivots about pivot pin 122 between a horizontally oriented condition for receiving the ingredients and an inclined condition (in broken outline) where its spout 124 is directed toward the drinking cup 126. The positioning of the vessel 120 is controlled by the action of 42 upon flange 128 extending outward from the side of vessel 120.

The upper chamber 70 of water storage vessel 64 communicates with the lower chamber 68 through an inlet port of passageway 130, the diameter of which is calibrated in relation to the diameter of passageway 110 in such a manner that when the poppet valve 88 is in open condition under control of cam 40, the water which flows through the inlet port 130 does not make up for that which flows out of the outlet port 110 with the result that the flow velocity through and out from outlet port 110 remains virtually constant during the dissolution of the coffee powder in vessel 120.

In order to prevent the possible formation of an air block or cushion within the chamber 68, preventing passage of water from the chamber 70 to the chamber 68, there is provided, in the stem 92, an axial bore 132 which opens to the interior of tube 74 and, at the lower end 134 thereof and, by way of radial passage 136, communicates to chamber 68; thus providing a pressure relief means or air bleed, which prevents the development of any undesired back pressure within the chamber 68.

Manual control means 138 also is provided in the form of an arm 140 extending from the lever 44. Arm 140 is operated upon, as desired, by manipulation of a hand-operated lever 142 in the direction of the arrow 144. The handle 146 of lever 144 is raised upwards, causing the flange 148 of arm 150 to bear against arm 140. The arrow 144 indicates the direction of movement of handle 146 to unseat the sealing disc 90 of valve 88. In this manner, it is possible at will to overcome the bias of spring 94 to produce a flow of water to dilute the drink already dispensed into the cup 126.

Exhaust means 152 near the vessel 120 is provided to remove dust and/or water vapor which might arise during the addition of the powdered coffee and water to the vessel 120. The said exhaust means comprises an impeller 154 of an exhaust fan directly coupled to a shaft 152 of electric motor 28. Impeller 154 is arranged in a pipe 156 having an air suction orifice 158 located in the vicinity of the vessel 120. The outlet 160 of pipe 156 is located at a considerable distance remote from the vessel 12.

Referring now to the operation of the apparatus 10, the constructional details of which has been described. The vessels 12 and 64 are filled respectively with lyophilized coffee and water, respectively. The heater means 52 is made operational. The motor 28 is energized to rotate the shaft 26 by way of reduction gear 38. The obturator disc 18 rotates to seal off the chamber 16 and the obturator disc 20 simultaneously rotates to place the opening 32 thereof in alignment with the outlet of the chamber 16 to discharge the predetermined amount of coffee powder from said chamber. The discharged powder falls into mixing vessel 120.

Simultaneously, cam 40 has actuated the lever 44, to raise sealing disc 90 of the poppet valve 88 from the seat 86 within the lower chamber 68 of water reservoir vessel 64. The water in chamber 68 passes into the chamber 102 and through passageway 110 thereof to the hopper 112. The valve 88 is maintained in open condition for a given period of time, conditioned on the configuration of the cam 40 which continuously rotates with the shaft 29. The diameters of passageways 110 and 130 are calibrated relatively so that the flow into chamber 68 from chamber 70 is less than the flow from said chamber 68 when the valve 88 is in open condition.

The water entering the hopper 112 travels through the coil 114 and is heated to the desired temperature to promote quick solution of the lyophilized coffee powder and passes through extension 114 thereof to be discharged from the spout 118 to enter the mixing vessel 120.

The cam 42 has now come into position to release the mixing vessel 120, causing it to incline and discharge the solution comprising the white coffee beverage to the cup 126.

If individual taste decrees reduction of the strength of the "brew," then handle 146 of lever 142 is actuated manually upwardly to override the bias of spring 94 and cause additional water to be discharged to the hopper 112 and coil 114 and thence to the inclined mixing vessel 120 for discharge therefrom to the cup 126.

During this elapse of time, the impeller 154 has been operating to cause any dust and/or water vapor at the mixing location to be sucked up at suction orifice 158 for discharge from pipe 158 at outlet orifice 160.

The bar machine 10 is compact, easy to operate and regulate and can provide the desired quality and consistency for the white coffee beverage, either in the coffee bar establishments or in the home.

What it is desired to be claimed by Letters Patent of the United States is:

1. Apparatus for producing and dispensing beverage from powder, said apparatus comprising, a mixing vessel, reservoir means for holding said powder, water reservoir means for storing water, first metering means associated with said reservoir means and adjacent said mixing vessel, second metering means associated with said water reservoir means, electrically operated heater means, a hollow coil arranged within said heater means and having an inlet adjacent said water reservoir means and an outlet in the vicinity of said mixing vessel and means for operating said metering devices so that metered quantities of said powder and heated water respectively are fed to said mixing vessel.

2. The apparatus as claimed in claim 1 in which said mixing vessel is an open topped cup-like member and means for tapping said mixing vessel subsequent to solution of said powder therein.

3. The apparatus as claimed in claim 1 in which said mixing vessel is an open-topped cup-like member, pivot means for mounting said mixing vessel so that it is oscillatory between a horizontal condition for receiving said powder and heated water, and an inclined condition whereby the solution contents thereof is dispensed and means for selectively maintaining one or the other of said conditions of said mixing vessel orientation.

4. The apparatus as claimed in claim 3 in which said means for operating and means for maintaining one or the other conditions of said mixing vessel are mounted on a common shaft.

5. The apparatus as claimed in claim 1 in which there are means for achieving constant flow of water through the hollow coil.

6. The apparatus as claimed in claim 5 in which the water reservoir means is disposed above the heater means and is divided into at least a pair of chambers arranged one above the other and a partition separating same, and said second metering means comprises said lower chamber having an inlet port formed in said partition for communication between upper and lower chambers, and having an outlet port, valve means at said inlet, means for controlling the delivery of water from the lower chamber to and through said outlet port, said last mentioned means comprising said inlet port being calibrated in relation to said outlet port whereby to achieve constant flow from said outlet port on actuation of said valve means.

7. The apparatus as claimed in claim 6 in which said second metering means includes valve means and said means for operating said metering devices include cam means operable upon valve means for selectively delivering a measured volume of water to the coil.

8. The apparatus as claimed in claim 7 and pressure relief means arranged in association with said partition for alleviation of back pressure within said lower chamber, said pressure relief means comprising a hollow tubular member mounted on said partition and having an inlet to said lower chamber and an outlet disposed above the liquid level in said upper chamber, a stem slidably, sealingly movable within said tubular member and having an axially extending passage, the upper end thereof opening to the interior of said tubular member and the lower end communicating with the interior of said lower chamber.

9. The apparatus as claimed in claim 8 wherein said axial passage communicates to said lower chamber by way of a radial bore formed in the stem.

10. The apparatus as claimed in claim 8 in which said stem is integral with the valve means.

11. The apparatus as claimed in claim 6 in which said inlet port is calibrated in relation to the outlet port so that water flowing to the lower chamber from the upper chamber during open condition of said valve means is insufficient to maintain the lower chamber full.

12. The apparatus as claimed in claim 11 in which said valve means is a poppet valve and said operating means include a lever mounted for pivotal movement, an actuator rod at one end of said lever and a cam operable on the other end of said lever, said actuator rod being coupled to said poppet valve and being slidably, sealingly movable axially through said heater means.

13. The apparatus as claimed in claim 12 in which there are provided manually operable means connected to said lever for overriding closed condition of said poppet valve for actuating said valve independently of said cam means.

14. The apparatus as claimed in claim 6 wherein said means for operating said metering devices include drive means comprising an electric motor, means coupling said motor to a shaft, a pair of cams disposed mounted on said shaft axially spaced one from the other for rotative movement therewith, one of said cams operable to actuate said valve means of the water reservoir and the other of said cam means operable upon said mixing vessel selectively to maintain the mixing vessel horizontal during addition of the powder and water and inclined for dispensing of the resulting solution.

15. The apparatus as claimed in claim 14 in which said coupling means include a reduction gear arrangement.

16. The apparatus as claimed in claim 14 and exhaust means driven directly by said motor, said exhaust means comprising an exhauster impeller disposed in a conduit and directly coupled to said motor, said conduit having an inlet orifice located at one end thereof and positioned adjacent the mixing vessel and the outlet of said coil, and an outlet orifice located remote from said mixing vessel.

17. The apparatus as claimed in claim 14 in which said shaft carries said first metering means and said first metering means comprises a pair of coaxially arranged obturator discs, one disposed within said powder reservoir means and the other disposed exterior thereof, said powder reservoir means having a metering chamber disposed between said obturator discs, said obturator discs each having an opening arranged for alternating alignment with said chamber at respective ends thereof for controlling alternate entry to and discharge therefrom of said powder and being rotatable with said shaft.

18. The apparatus as claimed in claim 17 in which said shaft is formed of a pair of coaxial sections, the inner obturator disc being secured to one of said sections and the exterior obturator disc being secured to the other of said sections and means for establishing a releasable coupling between said sections so that they rotate together.

19. The apparatus as claimed in claim 17 in which said valve means is a poppet valve and said operating means include a lever mounted for pivotal movement and a cam operable on one end of the lever and an actuator rod coupled to the other end of the lever, the actuator rod being coupled at its opposite end to the poppet valve, said actuator rod being slidably, sealingly movable axially through said heater means.

20. The apparatus as claimed in claim 19 in which the valve means include a downwardly depending projection having a free end extending outwardly of said water reservoir means and means establishing a releasable coupling between the said free end and the actuator rod, whereby said cam is mounted on said shaft and operates on said lever to raise and lower said actuator rod for selectively operating said valve means.

21. The apparatus as claimed in claim 1 in which said second metering means includes valve means and said means for operating said metering devices include cam means operable upon valve means for selectively delivering a measured volume of water to the coil.

22. The apparatus as claimed in claim 1 in which there are exhaust means arranged for removing dust and/or water vapor from the vicinity of said mixing vessel, said exhaust means being operable by way of a direct connection to said motor and said first and second metering means being operable by way of a reduction gear interposed connection to the same motor.

23. The apparatus as claimed in claim 1 in which said first metering means comprise an obturator disc device and said second metering means comprise a spring biased poppet valve, first and second cam means, shaft means mounting said obturator disc device and said first and second cam means for simultaneous rotation and drive means comprising an electric motor carrying said shaft, lever means articulated to operate said poppet valve and said first cam means during its rotation being operable upon said lever means to open said poppet valve for discharge of a metered volume of water from said reservoir to said coil, and said second cam means operable on the mixing vessel selectively to position said mixing vessel horizontally disposed for receiving said discharge powder from the obturator device and heated water from said coil, and inclined for discharge of the resulting solution, said heater means being disposed remote from said mixing vessel and said coil having an extension terminating at said mixing vessel.

24. The apparatus as claimed in claim 23 in which said first metering device is positioned over said mixing vessel whereby the powder is fed to said mixing vessel under gravity.

25. A bar machine for the production of "white coffee" in cups from lyophilized "white coffee" powder characterized in that it comprises a sealed reservoir for the coffee powder, with a metering device below it, a reservoir for water, a coil arranged to transport water from the reservoir therefor to a selected location, said coil being incorporated in an electrically heated metal mass for heating the water flowing through the coil, said water being delivered to the coil at a constant flow rate, a mixing vessel for receiving the heated water, said coil extending in the form of a section, and the discharge orifices of the metering device and of the said coil section opening at a location a short distance above the mixing vessel, said vessel being mounted so that it is oscillatory between a horizontal and an inclined condition.

26. A bar machine as claimed in claim 25, characterized in that the water reservoir is disposed above the metal mass incorporating the coil and in order to achieve constant flow of water through the heating coil, said water reservoir is divided into two chambers, one lower chamber and one upper chamber separated by a partition, at least the bottom part of the upper chamber and the lower chamber being coaxial with the metal mass, said two chambers communicating with one another through a calibrated passageway and there being disposed in the lower chamber, a spring biased poppet valve having a sealing disc bearing against the seat integral with the wall of said lower chamber, said valve being controlled by a cam whereby to control a discharge orifice through which discharge from said lower chamber takes place, the aforesaid passage between the two chambers being calibrated in relation to said discharge orifice.

27. A bar machine as claimed in claim 26, characterized in that the partition is equipped with a centrally located tube extending vertically upwards, the upper orifice of said tube opening above the level of the water in the reservoir and the lower orifice of said tube opening into the lower chamber, a stem slidably received in said tube, said stem having an axial bore which opens to the interior of the tube and opens at its lower end through a radial section, into the lower chamber.

28. A bar machine as claimed in claim 27, characterized in that the passage providing communication between the two chambers is calibrated in relation to the discharge orifice so that during the discharge, with the poppet valve open, the water which flows through the passage is insufficient to maintain the lower chamber in full condition.

29. A bar machine as claimed in claim 26, characterized in that the valve has a bottom shaft terminating exterior of said reservoir and having a free end engageable with the upper projecting end of a slidable rod, the lower end of said rod being articulated to a lever operating the poppet valve, the engagement being such as to enable easy removal, renewal or substitution of the vessel.

30. A bar machine as claimed in claim 25, characterized by cam means for controlling the discharge of the water, a lever operated by said cam means and a rod articulated to one end of the lever and axially slidable within said metal mass, spring biased valve means coupled to the other end of said lever and the rod operable to actuate said valve means.

31. A bar machine as claimed in claim 30, characterized in that there is provided means for manually actuating said lever to override the spring bias of said valve means in closed condition thereof to maintain the discharge of the heated water.

32. A bar machine as claimed in claim 25, characterized in that there is provided cam means, said metering device comprising a pair of obturator discs and a shaft carrying the cam means and the obturator discs, said shaft being coupled for operation to an electric motor by a reduction gear coupled to said shaft and an electric motor coupled thereto to effect rotation of said shaft.

33. A bar machine as claimed in claim 32, characterized in that the electric motor directly drives an exhauster impeller located in a pipe which, at the point at which the water enters the mixing vessel, has a suction orifice and discharges the air which it sucks in, through the other end of the pipe, at a location remote from said mixing vessel.

34. A bar machine as claimed in claim 32, characterized in that the shaft is formed in two sections, one of which is integral with one obturator disc and the other of which is integral with the other obturator disc and the cam means, the two sections being engaged with one another in such a way that they are readily releasable.

\* \* \* \* \*